United States Patent
Fear

(10) Patent No.: US 12,059,628 B2
(45) Date of Patent: Aug. 13, 2024

(54) JOINING OR REPLAYING A GAME INSTANCE FROM A GAME BROADCAST

(71) Applicant: NVIDIA Corporation, Santa Clara, CA (US)

(72) Inventor: Andrew Fear, Cedar Park, TX (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/745,522

(22) Filed: May 16, 2022

(65) Prior Publication Data

US 2022/0274027 A1    Sep. 1, 2022

Related U.S. Application Data

(63) Continuation of application No. 16/548,677, filed on Aug. 22, 2019, now Pat. No. 11,331,586.

(51) Int. Cl.
*A63F 13/86* (2014.01)
*A63F 13/71* (2014.01)
*A63F 13/795* (2014.01)

(52) U.S. Cl.
CPC .............. *A63F 13/86* (2014.09); *A63F 13/71* (2014.09); *A63F 13/795* (2014.09)

(58) Field of Classification Search
None
See application file for complete search history.

(56) References Cited

U.S. PATENT DOCUMENTS

| 10,112,110 B1 | 10/2018 | Garavito et al. |
| 2008/0119286 A1 | 5/2008 | Brunstetter et al. |

(Continued)

FOREIGN PATENT DOCUMENTS

| CA | 2953806 A1 | 12/2015 |
| CN | 101484219 A | 7/2009 |

(Continued)

OTHER PUBLICATIONS

Fear, Andrew; First Office Action for Chinese Patent Application No. 202010738355.6, filed Jul. 28, 2020, mailed Nov. 6, 2023, 29 pgs.

(Continued)

*Primary Examiner* — Peter J Iannuzzi
(74) *Attorney, Agent, or Firm* — Taylor English Duma L.L.P.

(57) ABSTRACT

In various examples, metadata of either a live stream game instance or a pre-recorded game instance may be included in a stream data from a game stream and used to enable access to play an instance of a game. A viewer of the stream may desire to participate in an instance of the game, and the system may use the metadata to determine authentication for the viewer with respect to a game platform hosting the game, access restrictions for the viewer with respect to the game, identification information for the streamer of the instance of the game, and/or game modification information for the particular instance of the game within the stream. This information may be used to seamlessly transition the viewer from a passive role in viewing the stream of the instance of the game on a streaming platform to actively participating in the instance of the game or another instance of the game on a gaming platform.

20 Claims, 7 Drawing Sheets

(56) References Cited

U.S. PATENT DOCUMENTS

| | | |
|---|---|---|
| 2015/0297998 A1 | 10/2015 | Karamfilov et al. |
| 2016/0184712 A1 | 6/2016 | Colenbrander |
| 2017/0001111 A1* | 1/2017 | Willette .................. A63F 13/49 |
| 2017/0087464 A1 | 3/2017 | Perry et al. |
| 2018/0001216 A1 | 1/2018 | Bruzzo et al. |
| 2019/0192974 A1 | 6/2019 | Eatedali et al. |

FOREIGN PATENT DOCUMENTS

| | | |
|---|---|---|
| CN | 107050858 A | 8/2017 |
| CN | 109152957 A | 1/2019 |
| CN | 110121379 A | 8/2019 |
| EP | 2537568 A1 | 12/2012 |

OTHER PUBLICATIONS

Fear, Andrew; Notice of Registration for Chinese Patent Application No. 202010738355.6, filed Jul. 28, 2020, mailed Apr. 28, 2024, 5 pgs.

* cited by examiner

JOINING OR REPLAYING A GAME INSTANCE FROM A GAME BROADCAST

CROSS-REFERENCE TO RELATED APPLICATIONS

This application is a continuation of U.S. patent application Ser. No. 16/548,677, filed on Aug. 22, 2019. The contents of each of which are hereby incorporated by reference in their entirety.

BACKGROUND

Streaming has proved to be one of the most disruptive technologies in the media landscape in the last decade. Near instant access to movies, television shows, and music has fundamentally changed the way end-users watch, listen, and interact with media content. Streaming is also quickly transforming the way end-users interact with other media content—such as games. For example, streaming has enabled an end-user (e.g., a streamer) to share their gameplay experience live with other end-users (e.g., viewers). Similarly, streaming has also enabled a streamer to record their gameplay experience, and later share their recorded gameplay with other viewers. Watching such pre-recorded or live streams of a streamer's gameplay experience has become increasingly popular as a supplement to, or replacement of, both traditional video gaming and traditional television program viewing.

In conventional systems, transitioning from passively viewing a live or pre-recorded stream to actively playing and/or participating in the game is a tedious task. For example, due to various barriers to entry (e.g., time, price, computer resources, network resources, etc.), a viewer who decides they want to join a streamer who is live streaming their gameplay has to determine the platform the streamer is using, locate the digital store the game is located on, locate the game within the digital store, buy the game and/or download the game (which, depending on file size, could require a considerable amount of time, bandwidth, computer memory, and/or other valuable computer and network resources). Even further, once purchase and download has occurred, the viewer might have to set up a user profile, log into the game, find the streamer's username (e.g., identifier), request to join the game with the streamer, and then hope for an acceptance. Once all of these tasks have been completed, the streamer may no longer be playing the game. Similarly, a viewer who decides they want to play a similarly or identically modified version of a game (e.g., a ray-traced modified version of a game) may not be able to locate that specific modification or version in any publicly available digital store—or that version may not publicly available. It would be beneficial to have a system that could minimize the friction and barriers to entry into an identified game instance by streamlining the process from passively watching a stream to actively participating.

SUMMARY

Embodiments of the present disclosure relate to joining or replaying a game instance from a game broadcast. Systems and methods are disclosed that use metadata from various game streams (e.g., live game stream instance, pre-recorded game instance, etc.) to enable the seamless transition from passively watching a live stream of an instance of a game or a pre-recorded instance of the game, to actively participating in the game.

In contrast to conventional systems, such as those described above, the present system identifies and stores metadata associated with either a live stream or a pre-recorded stream to enable a user viewing the stream within a streaming application access to a game on a game platform directly from the streaming application. For example, the metadata may include the name information of the game being streamed, the platform identification information on which the game is played and/or on which the streamer is playing, digital store information associated with where to purchase the game (should purchase be necessary), information regarding any specific versions, modifications, user-inventory, etc., associated with the gameplay stream, and/or the username (e.g., identification) information of the streamer streaming the gameplay (e.g., the username of the streamer on the specific platform/digital store).

Using the identified metadata, and as a viewer views the stream on a display, a graphical element (e.g., a "join now" button) may be populated on the display that enables the viewer to request access to join in on gameplay of an instance of the game from a live stream or a modified instance of the game based on a pre-recorded stream. As such, upon the selection of the graphical element, the game may be launched on the viewer's device (e.g., in a web browser portal, in a standalone application, etc.).

Once validated (e.g., to confirm that the user has an account on the game platform and/or that the user has purchased or otherwise has access to the game), the viewer may be logged into the platform using an identity management (IDM) system, such that the gameplay statistics, records, accolades, achievements, and/or other game related information are associated with a username of the viewer as the viewer now becomes an active player of the game (e.g., in a live game instance against the streamer, in a modified game instance based on a pre-recorded game instance, and/or the like). As a result, and in contrast to the disjointed approaches of conventional systems for joining a game instance represented in stream, the system of the present disclosure may enable seamless and efficient transfer from a viewer viewing a stream of an instance of a game on a streaming platform to a player participating in the instance of the game on a game platform.

BRIEF DESCRIPTION OF THE DRAWINGS

The present systems and methods for joining or replaying a game instance from a game broadcast are described in detail below with reference to the attached drawing figures, wherein.

DETAILED DESCRIPTION

Figure 1A:
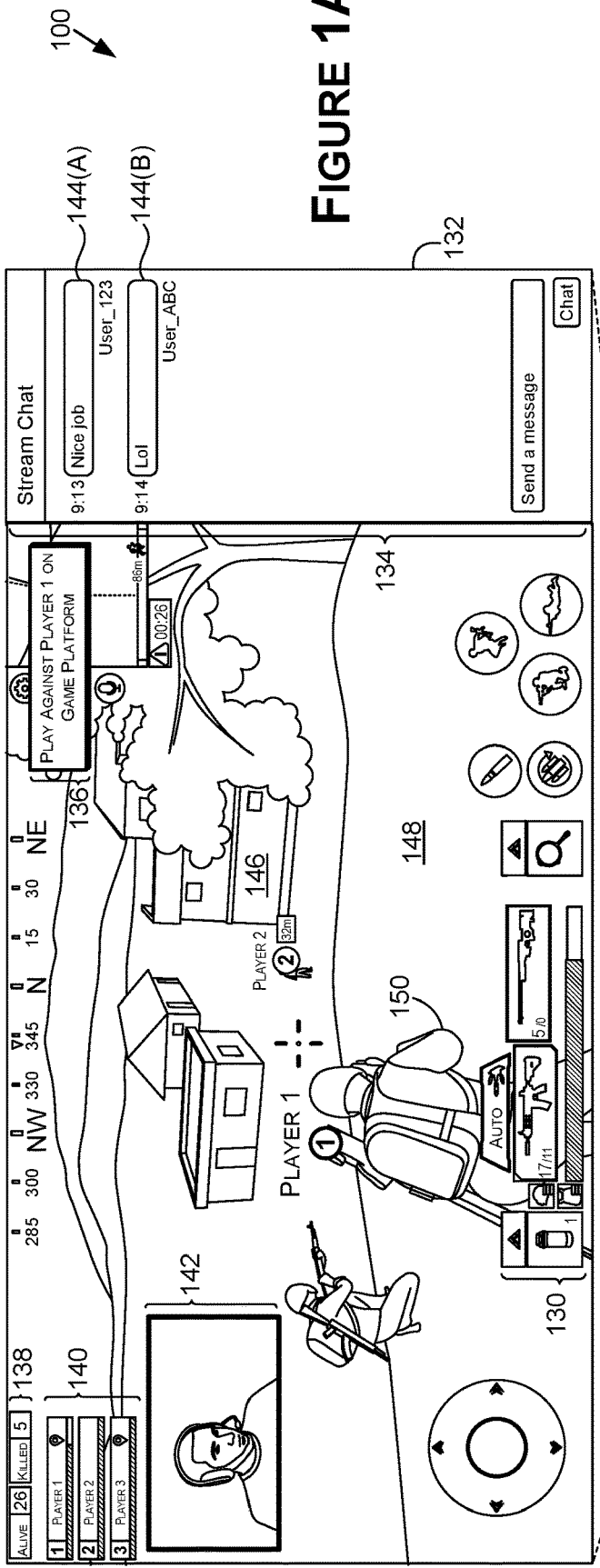
FIG. 1A is an example system diagram for joining or replaying a game instance from a game broadcast, in accordance with some embodiments of the present disclosure.
Figure 1A:
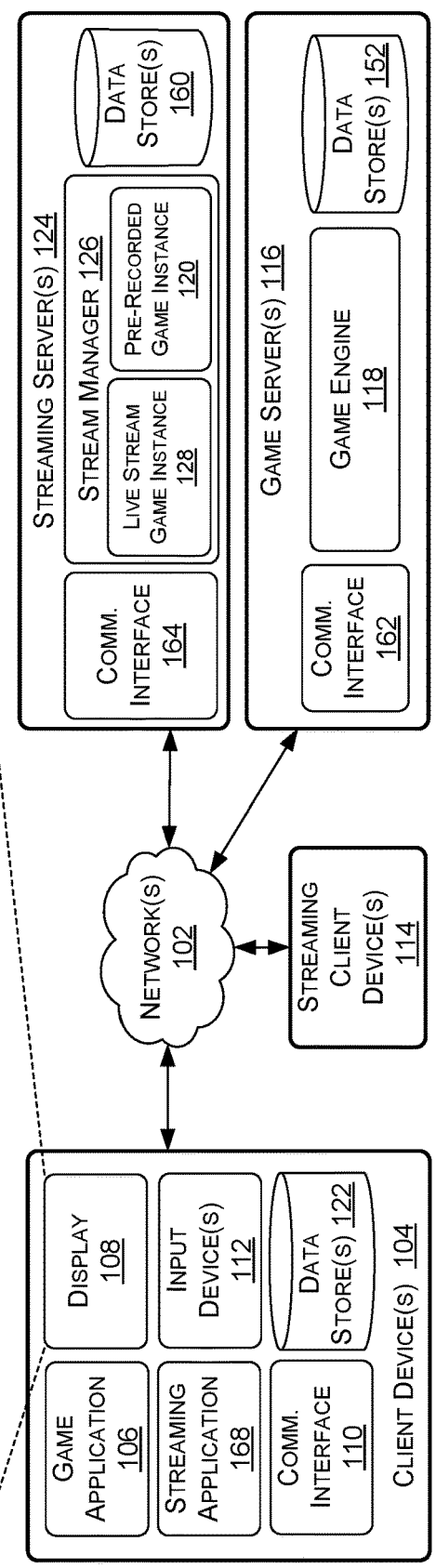

Systems and methods are disclosed related to joining or replaying a game instance from a game broadcast. For example, when a viewer is watching a live or pre-recorded gameplay stream, the viewer may find the game interesting and decide they want to play the same unmodified version of game the streamer is playing; play with and/or against the streamer during the live stream; play the same scenario (e.g., a specific or modified version, or at a level or with items/weapons/skills that the streamer has) the streamer is playing; or, re-enact a specific challenge the streamer is completing in a specific gameplay instance (e.g., with similar or identical in-game constraints including, without limitation, character life points, outfit options, weapon inventory, and/or the like). As such, the present disclosure provides for a seamless, efficient transition from passively watching a gameplay stream (e.g., a live stream or a pre-recorded stream) to actively participating in a game represented in the gameplay stream.

In some embodiments, as a viewer views a live stream instance of gameplay that a streamer is streaming, metadata associated with the stream may be received and/or stored. The metadata may include the name information of the game being streamed, the platform identification information on which the game is played and on which the streamer is playing, digital store information associated with where to purchase the game (should purchase be necessary), information regarding any specific versions, modifications, user-inventory, etc. associated with the gameplay stream, and the username (e.g., identification) information of the streamer streaming the gameplay (e.g., the username of the streamer on the specific platform/digital store). Using this information, and as the viewer views the live stream on a display, a graphical element (e.g., a "join now" button) may be populated on the display that may enable the viewer to request access to join the streamer's gameplay. As such, upon the selection of the graphical element—and using the metadata representative of the digital store, game name, and/or platform information—the game may be launched on the viewer's device (e.g., in a web browser portal, in a standalone application, etc.).

The viewer may be validated by the game system, in embodiments, such as to confirm that the user has an account on the game platform and/or that the user has purchased or otherwise has access to the game. Once validated, the viewer may be logged into the platform using an identity management system (IDM), such that the username of the viewer is active for playing with the streamer, playing against the streamer, and/or otherwise playing an instance of the game. For the streamer participating in the game, the streamer may receive a request or other indication that the now in-game viewer wishes to join their gameplay. The streamer may optionally be presented with the option to accept or deny the request, and/or the viewer may be added to a queue for playing with the streamer. Upon the streamer accepting the viewer's join request or the viewer rising to the top of the queue, the viewer—with their associated game platform username—may be added to the game to play with and/or against the streamer.

In this way, by using the stored metadata, the current system may minimize the friction and/or delay between transitioning between passively viewing a gameplay stream and actively participating alongside a streamer during a live stream. The current system may thus allow a viewer of a game instance to join (e.g., substantially instantaneously) the game instance with a streamer at a current game state of the streamer within the game instance.

Similarly, as viewers view a pre-recorded instance of a gameplay that a streamer is streaming, metadata associated with the stream may also be tracked and/or stored. Here, the metadata may be similar to the metadata described herein with respect to live streams (e.g., name information, platform identification information, digital store information, etc.). As the viewer views the pre-recorded stream on a display, a graphical element (e.g., a "play now" button) may appear that enables the viewer to play the specific version of the game they are viewing. Upon the selection of the graphical element, the game the viewer is viewing may be launched (e.g., after verification, and in a web browser portal, a standalone application, etc.).

In some embodiments, if the game the viewer is viewing has specific restrictions (e.g., due to progress of the streamer, such as levels, achievements, experiences, etc.) for who may access certain attributes of the game, the viewer may be granted access to play the game that corresponds to the progress of the streamer—even where the viewer does not otherwise have access to such levels, achievements, and/or experiences. In other embodiments, the viewer may only be able to play the game based on the viewer's current progress or restrictions within the game, so the unlocked modifications of the game may be used but the locked modifications may remain locked. In some instances, a viewer may attempt to recreate a specific challenge, level, or other gameplay portion completed by a streamer using the same stats, perks, and/or modifications as the streamer (e.g., same life points, weapons inventory, vehicle, outfit, etc.). In such an example, the game system may use the metadata associated with the instance of the pre-recorded game streamed by the streamer including specific versions, modifications, user-inventory, etc., associated with the pre-recorded gameplay stream, to enable such gameplay. By using the stored metadata, the current system may minimize the friction between transitioning between passively viewing a stream of an instance of a game having certain unlocked restrictions and actively participating in another instance of the game generated to include the unlocked restrictions.

With reference to FIG. 1A, FIG. 1A is an example system diagram of a gameplay system 100 for joining or replaying a game instance from a game broadcast for a cloud gamming environment, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The gameplay system 100 may include, among other components and/or devices, one or more client devices 104, one or more streaming client devices 114, one or more streaming servers 124, and one or more game servers 116. The gameplay system 100 (and the components and/or features thereof) may be implemented using a game streaming system, such as game streaming system 400, described in more detail herein. In addition, the gameplay system 100 (and the components and/or features thereof) may be implemented using the one or more computing device(s), such as the computing device 500 of FIG. 5, described in more detail herein.

Each of the devices and/or components of the gameplay system 100 may communicate over network(s) 102. The network(s) may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a global navigation satellite system (GNSS) network (e.g., the Global Positioning System (GPS)), and/or another network type. In any example, each of the devices or components of the gameplay system 100 may communicate with one or more of the other devices and/or components via one or more of the network(s) 102.

The client device(s) 104 may include a smart phone, a laptop computer, a tablet computer, a desktop computer, a wearable device, a game console, a virtual reality system (e.g., a headset, a computer, a game console, remote(s), controller(s), and/or other components), an NVIDIA SHIELD, a smart-home device that may include an intelligent personal assistant, and/or another type of device capable of supporting at least display of a game stream of a game session, such as game session 132 and/or inputs to the game session 132 from input devices, such as input device(s) 112.

The client device(s) 104 may include a game application 106, a streaming application 168, a display 108, a communication interface 110, one or more input device(s) 112, and one or more data store(s) 122. Although only a few components and/or features of the client device(s) 104 are illustrated in FIG. 1A, this is not intended to be limiting. For example, the client device(s) 104 may include additional or alternative components, such as those described below with respect to the computing device 500 of FIG. 5.

The client device(s) 104 may be one or more components (e.g., a communication component, network interface, etc.) and features for communicating across one or more networks, such as the network(s) 102. As a non-limiting example, to communicate within the gameplay system 100, the client device(s) 104 may use a wired Ethernet connection and/or Wi-Fi connection through a router to access the Internet in order to communicate with the streaming client device(s) 114, the streaming server(s) 124, the game server(s) 116, and/or with other client device(s) 104.

The game application 106 may be a mobile application, a computer application, a console application, a web application, and/or another type of application. The game application 106 may include instructions that, when executed by a processor(s) of the client device(s) 104, cause the processor(s) to perform one or more operations (such as but not limited to the operations described herein with respect to the gameplay system 100). The game application 106 may receive and/or process inputs from one or more of the input device(s) 112 of the client device(s) 104, and/or cause transmission of input data representative of the inputs to the streaming server(s) 124, game server(s) 116, streaming client device(s) 114, and/or other client device(s) 104.

The streaming application 168 may operate as a facilitator for enabling viewing of an instance of a game (e.g., a live stream game instance 128 or a pre-recorded game instance 120). For example, and without limitation, the streaming application 168 may cause display of a live stream of a game instance of a game, such as the live stream game instance 128, received from the streaming server(s) 124. The game application 106 may also display a pre-recorded stream of a game instance of a game, such as the pre-recorded game instance 120, received from the streaming server(s) 124.

Although illustrated as separate application, the game application 106 and the streaming application 168 may include a single application, without departing from the scope of the present disclosure. For example, where gameplay and streaming of gameplay are hosted by a same platform (e.g., NVIDIA's GEFORCE EXPERIENCE), the game application 106 and the streaming application 168 may include a same application. In other embodiments, such as illustrated in FIG. 1A, the game application 106 and the streaming application 168 may be separate application—even where the gameplay and streaming are hosted by a same platform, in embodiments.

The game application 106 and/or the streaming application 168 may be configured to identify metadata associated with a live stream instance of a game or a pre-recorded instance of a game—such as the live stream game instance 128 received from the streaming server(s) 124 and/or the pre-recorded game instance 120 received from the streaming server(s) 124. For example, with regard to the live stream game instance 128, the game application 106 and/or the streaming application 168 may be configured to identify an identifier (e.g., username) of the streamer sharing (e.g., streaming) the live stream, the platform (e.g., digital store) information on which the instance of the game is being played by the streamer, and/or the title of the game. Further, with regard to the pre-recorded game instance 120, the game application 106 and/or the streaming application 168 may be configured to identify the platform (e.g., digital store) information on which the instance of the game was played, the title of the game, and/or any game instance identifier information of the game (e.g., information associated with specific versions, modifications, user-inventory, life points, weapons-inventory, vehicle, outfit, stats, etc.). In some embodiments, the game application 106 and/or the streaming application 168 may store the identified metadata in a data store, such as the data store(s) 122, as described in more detail below.

In some examples, once the viewer is participating in gameplay (e.g., after being transferred from the stream), the client device(s) 104 may render the instance of the game using the game application 106. In other examples, the client device(s) 104 may receive display data (e.g., encoded display data, as described with respect to FIG. 4), and the game application 106 may use the display data to cause display of the instance of the game on the display 108. In examples where the display data is received by the client device(s) 104 (e.g., where the client device(s) 104 does not generate the rendering), the gameplay system 100 may be part of a game streaming system, such as the game streaming system 400 of FIG. 4, described in more detail below.

The display 108 may include any type of display capable of displaying an instance of a game (e.g., a light-emitting diode display (LED), an organic LED display (OLED), a liquid crystal display (LCD), an active matrix OLED display (AMOLED), a quantum dot display (QDD), a plasma display, and/or another type of display). In some examples, depending on the configuration of the client device(s) 104, the display 108 may include more than one display (e.g., a dual-monitor display for computer gaming, a first display for configuring a game and a virtual reality display for playing the game, etc.), may include a display of an augmented reality (AR) or virtual reality (VR) system, and/or may include another number or type of display. Where the display 108 is a touch-screen display, such as a touch-screen of a smart phone, tablet computer, laptop computer, and/or the like, the display 108 may be used as at least one of the input device(s) 112 of the client device(s) 104 (e.g., one of the input device(s) 112 for generating inputs to an instance of the game, such as for transmission to the streaming client device(s) 114, streaming server(s) 124, game server(s) 116, and/or other client device(s) 104). The display 108 may display a game stream, such as the live stream game instance 128 and/or the pre-recorded game instance 120, of one or more game sessions, such as game session 132. The game session 132 may include any number of game sessions participated in by the user (e.g., streamer) of streaming client device(s) 114 and/or the user (e.g., viewer) of client device(s) 104.

The display 108 may display an instance of a game during gameplay, and/or may display a stream of a game of another player (e.g., a streamer), such as the game session 132 representative of the live stream game instance 128 and/or the pre-recorded game instance 120. Although illustrated as a visualization of a stream of gameplay in FIG. 1A (thus including the button 136), the game session 132 may include, without limitation, a game session participated in by the user (e.g., viewer) of the client device(s) 104 (and may not include the button 136, in such examples), by the user (e.g., streamer) of streaming client device(s) 114, by both the streamer of the streaming client device(s) 114 and the viewer of the client device(s) 104, by users (e.g., viewers) of other client device(s) 104 and/or streaming client device(s) 114, and/or a combination thereof.

The game session 132 may include game session data (e.g., game state data). The game session data may represent a current state of the game, including game statistics, object states, inventories, health information, player locations, achievement progress, modifications, and/or other information about players, game information, and/or environment features (e.g., a location of "Player 1" 150, a state of building 146, attributes of cliff 148, current weapons inventory 130, kill count information 138, player information 140, etc.).

The game session 132, or display thereof within the game application 106 and/or the streaming application 168, may further include graphical elements, such as streamer window 142, chat box 134, chat messages 144A and 144B, and button 136. As illustrated in FIG. 1A, the streamer window 142 may depict a visual representation of the user (e.g., streamer) on the streaming client device(s) 114 playing an instance of a game that is displayed to a user (e.g., viewer) of the client device(s) 104 on display 108. The button 136 may include a graphical element that, using the metadata in the stream of the game instance, enables the viewer of the game instance to either join a live stream of the game instance to play with and/or against the streamer, or play a pre-recorded stream of the game instance including any combination of the modifications to the game (e.g., weapons inventory, outfit, vehicle, etc.). Although the graphical elements (e.g., the button 136, the chat box 134, etc.) are located in the illustrated arrangement in the visualization of the game session 132, this is not intended to be limiting, and the graphical elements may be located at any location within the game session 132, may change locations throughout the game session 132, and/or the like, without departing from the scope of the present disclosure. For example, the button 136 may be located in the chat box 134, the streamer window 142 may be located on the bottom right, and so on.

The input device(s) 112 may include any type of devices that are capable of providing user inputs to the game. The input device(s) 112 may include a keyboard, a mouse, a joystick, a touch-screen display, a controller(s), a remote(s), a headset (e.g., sensors of an AR or VR headset), another type of input device, and/or a combination thereof.

The communication interface 110 may include one or more components and features for communicating across one or more networks, such as the network(s) 102. The communication interface 110 may be configured to communicate via any number of network(s) 102, described herein. For example, to communicate in the gameplay system 100 of FIG. 1A, the client device(s) 104 may use an Ethernet or Wi-Fi connection through a router to access the Internet in order to communicate with the streaming server(s) 124, the game server(s) 116, the streaming client device(s) 114, and/or other client device(s) 104.

The data store(s) 122 may include any memory device type(s). In embodiments where the instance of the game is a live stream such as the live stream game instance 128, the data store(s) 122 may be tasked with the storage of metadata associated with the live stream game instance 128 identified by components of client device(s) 104, such as the game application 106 and/or the streaming application 168. In particular, the metadata associated with the live stream game instance may include an identifier (e.g., username) of the streamer sharing (e.g., streaming) the live stream, the platform (e.g., digital store) information on which the instance of the game is being played by the streamer, the title of the game, and/or other information. For example, the metadata associated with a live stream game instance 128 may include information that "Streamer_123" is live streaming an instance of "Game_ABC" using "Platform_XYZ." As such, when a viewer selects the button 136, this metadata may be used to log into Platform_XYZ, authenticate the viewer for playing the Game_ABC, and launching the instance of the game for playing with Streamer_123.

In embodiments where the instance of the game is a pre-recorded stream, such as the pre-recorded game instance 120, the data store(s) 122 may be tasked with the storage of metadata associated with the pre-recorded game instance 120 identified by components of client device(s) 104, such as game application 106 and/or the streaming application 168. In particular, the metadata associated with the pre-recorded game instance may include the platform (e.g., digital store) information on which the instance of the game was played, the title of the game, any game instance identifier information of the game (e.g., information associated with specific versions, modifications, user-inventory, life points, weapons-inventory, vehicle, outfit, stats, etc.), and/or other information. For example, the metadata associated with a pre-recorded game instance may include information that the game is titled "Game_ABC", that the game is being played on platform "Platform_XYZ", and/or that the game instance identifier is "1234ABC". The game instance identifier may be used to determine information about the particular pre-recorded instance of the game, such as the game state information, modification information, etc. For example, a modification for Game_ABC may be a ray-tracing (including, without limitation, path tracing and ray or path casting, and their derivatives) modification, and the game state information may represent user inventory, life points, weapons inventory, vehicles, outfits, stats, etc., for Game_ABC.

In some examples, the data store(s) 122 may only store a portion of the metadata associated with live stream game instance 128 and/or pre-recorded game instance 120. In other examples, the data store(s) 122 may store all of the metadata associated with live stream game instance 128 and/or pre-recorded game instance 120.

The streaming client device(s) 114 may be a smart phone, a laptop computer, a tablet computer, a desktop computer, a wearable device, a game console, an AR or VR system (e.g., a headset, a computer, a game console, remote(s), controller(s), and/or other components), an NVIDIA SHIELD, a smart-home device that may include an intelligent personal assistant, and/or another type of device capable of supporting gameplay and/or streaming.

Although not shown, the streaming client device(s) 114 may include a game application similar to game application 106 of client device(s) 104, a streaming application similar to the streaming application 168 of the client device(s) 104, a display similar to display 108 of client device(s) 104, a communication interface similar to communication interface 110 of client device(s) 104, one or more input device(s) similar to the input device(s) 112 of client device(s) 104, and one or more data store(s) similar to the data store(s) 122 of client device(s) 104. The components included in the streaming client device(s) 114 may include similar features and/or functionality to components included in client device(s) 104. Although none of the components and/or features of the streaming client device(s) 114 are illustrated in FIG. 1A, this is not intended to be limiting. For example, the streaming client device(s) 114 may include additional or alternative components, such as those described below with respect to the computing device 500 of FIG. 5.

The streaming client device(s) 114 may include one or more components (e.g., a communication component, network interface, etc.) and features for communicating across one or more networks, such as the network(s) 102. As a non-limiting example, to communicate within the gameplay system 100, the streaming client device(s) 114 may use a wired Ethernet connection and/or Wi-Fi connection through a router to access the Internet in order to communicate with the client device(s) 104, the streaming server(s) 124, the game server(s) 116, and/or with other streaming client device(s) 114.

Although not shown, the game application of streaming client device(s) 114 may be a mobile application, a computer application, a console application, a web application, and/or another type of application. The game application of streaming client device(s) 114 may include instructions that, when executed by a processor(s) of the streaming client device(s) 114, cause the processor(s) to perform one or more operations (such as but not limited to the operations described herein with respect to the gameplay system 100). The game application of streaming client device(s) 114 may operate as a facilitator for enabling gameplay of an instance of a game (e.g., playing a game instance for live stream to viewers; playing a game instance to stream in the future as a pre-recorded game instance).

For example, a game application of the streaming client device(s) 114 may, without limitation, cause display of a game instance of a game for a streamer to play and a streaming application may cause generation of the live stream game instance 128 and/or the pre-recorded game instance 120 for transmission to one or more viewers, such as the viewers associated with the client device(s) 104. Causing the generation of the live stream game instance 128 may include, in non-limiting examples, capturing the stream at the streaming client device 114 and/or transmitting a signal to the streaming server(s) 124 to generate the live stream game instance 128 and/or the pre-recorded game instance 120—e.g., using the game application and/or the streaming application of the streaming client device 114. In examples where a signal is transmitted to the servers (e.g., in a cloud gaming environment, such as described with respect to FIG. 4), the game server(s) 116 and/or the streaming server(s) 124 may, alone or in combination, capture the live stream game instance 128 and/or the pre-recorded game instance 120 as a stream for transmission to one or more client device(s) 104 (e.g., for display using the streaming application 168 of the client device(s) 104). The game application of streaming client device(s) 114 may receive and/or process inputs from one or more of input device(s) of the streaming client device(s) 114, and/or cause transmission of input data representative of the inputs to the streaming server(s) 124, the game server(s) 116, the client device(s) 104, and/or other streaming client device(s) 114.

The game application and/or the streaming application of the streaming client device(s) 114 may be configured to include metadata associated with a live stream game instance 128 of a game and/or a pre-recorded game instance 120 of a game. For example, with regard to a live stream instance of a game, the game application and/or the streaming application of the streaming client device(s) 114 may be configured to transmit—with the data representative of the live stream game instance 128—an identifier (e.g., username) of the streamer sharing (e.g., streaming) the live stream, the platform (e.g., digital store) information on which the instance of the game is being played by the streamer, the title of the game represented in the stream, and/or other information. As another example, and with regard to a pre-recorded stream instance of a game, the game application and/or streaming application of the streaming client device(s) 114 may be configured to transmit—with the data representative of the live stream game instance 128—an identifier (e.g., username) of the streamer sharing (e.g., streaming) the live gameplay session, the platform (e.g., digital store) information on which the instance of the game is being played by the streamer, the title of the game represented in the stream, any game instance identifier information of the game (e.g., information associated with specific versions, modifications, user-inventory, life points, weapons-inventory, vehicle, outfit, stats, etc.), and/or other information. Although discussed as being transmitted by the streaming client device(s) 114, the metadata may be generated and/or transmitted by the streaming server(s) 124 and/or the game server(s) 116, in addition to or alternatively from the streaming client device(s) 114.

In some examples, the streaming client device(s) 114 may render the instance of the game (e.g., live stream of a game instance, pre-recorded game instance) using the game application of the streaming client device(s) 114, while in other examples, the streaming client device(s) 114 may receive display data (e.g., encoded display data, as described with respect to FIG. 4) and use the display data to display the instance of the game on the display of the streaming client device(s) 114. In examples where the display data is received by the streaming client device(s) 114 (e.g., where the streaming client device(s) 114 does not generate the rendering), the gameplay system 100 may be part of a game streaming system, such as the game streaming system 400 of FIG. 4, described in more detail below.

The game server(s) 116 may include one or more servers (e.g., dedicated game servers) for storing, hosting, managing, and, in some examples, rendering a game. The game server(s) 116 may be used to create, update, and/or modify a game (e.g., the program code of the game), as well as to host the game (e.g., as dedicated game servers). The game server(s) 116 may further include a communication interface 162 similar to communication interface 110 of client device(s) 104, a game engine 118, and a data store(s) 152 similar to the data store(s) 122 of the client device(s) 104. Although only a few components and/or features of the game server(s) 116 are illustrated in FIG. 1A, this is not intended to be limiting. For example, the game server(s) 116 may include additional or alternative components, such as those described below with respect to the game server(s) 402 of FIG. 4 and/or the computing device 500 of FIG. 5.

The game server(s) 116 may include one or more APIs to enable gameplay by the client device(s) 104, the streaming client device(s) 114, and/or to enable communication of information (e.g., metadata, game session data, etc.) with the streaming server(s) 124. For example, the game server(s) 116 may include one or more game APIs that interface with the game applications 106 of the client devices 104 to enable gameplay by the client devices 104. As another example, the game server(s) 116 may include one or more game session APIs that interface with game applications of the streaming client device(s) 114 to enable gameplay by the streaming client device(s) 114. As a further example, the game server(s) 116 may include one or more game session APIs that interface to pass game session data (including metadata of a live stream instance of a game and metadata of a pre-recorded game instance of a game) to the streaming server(s) 124. Although different APIs are described herein, the APIs may be part of a single API, two or more of the APIs may be combined, different APIs may be included other than those described as examples herein, or a combination thereof.

The game engine 118 may include the functionality that enables a game to be played by one or more users (e.g., streamers, viewers, etc.) over a network, such as network(s) 102. The game engine 118 may include a rendering engine, an audio engine, a physics engine, an animation engine, an artificial intelligence engine, a networking engine, a streaming engine, a memory management engine, and/or other components or features. The game engine 118 may be used to generate some or all of the game session data (e.g., metadata) during a game session.

Communication interface 162 may include one or more components and features for communicating across one or more networks, such as the network(s) 102. The communication interface 162 may be configured to communicate via any number of network(s) 102, described herein. For example, to communicate in the gameplay system 100 of FIG. 1A, the game server(s) 116 may use an Ethernet or Wi-Fi connection through a router to access the Internet in order to communicate with the streaming server(s) 124, the streaming client device(s) 114, client device(s) 104, and/or other game server(s) 116.

The data store(s) 152 may include any memory device type(s). The data store(s) 152 may be tasked with the storage of metadata associated with the live stream game instance 128 and/or the pre-recorded game instance 120 identified by the game server(s) 116, the streaming server(s) 124, the streaming client device(s) 114, the client device(s) 104, and/or a combination thereof. The metadata may include, but is not limited to, the types of metadata described herein (e.g., title, username, etc.). As described herein, in some examples, the data store(s) 152 may only store a portion of the metadata associated with live stream game instance 128 and/or pre-recorded game instance 120. In other examples, the data store(s) 152 may store all of the metadata associated with live stream game instance 128 and/or pre-recorded game instance 120. For example, the metadata may be stored between and among the various devices of the gameplay system 100, and may be retrieved for inclusion in streams of games for transmission to client device(s) 104.

The streaming server(s) 124 may include one or more servers. Streaming server(s) may include, without limitation, dedicated streaming servers for storing, hosting, managing, provisioning (e.g., from a cloud computing ecosystem) and, in some examples, rendering an instance of a game (e.g., where a stream is generated from game state data corresponding to a game). In some examples, different streaming server(s) 124 may be used for managing live streams than for managing pre-recorded streams, while in other examples, any streaming server 124 may handle both live streams and pre-recorded streams. The streaming server(s) 124 may further include a communication interface 164 similar to communication interface 110 of client device(s) 104, a stream manager 126, and a data store(s) 160 similar to the data store(s) 122 of client device(s) 104. Although only a few components and/or features of the streaming server(s) 124 are illustrated in FIG. 1A, this is not intended to be limiting. For example, the streaming server(s) 124 may include additional or alternative components, such as those described below with respect to the computing device 500 of FIG. 5.

The streaming server(s) 124 may include one or more APIs to generate and/or transmit a stream of an instance of a game to the client device(s) 104 and/or to enable communication of information (e.g., metadata, game session data, etc.) to, between, and/or among the game server(s) 116, the streaming client device(s) 114, and/or the client device(s) 104. For example, the streaming server(s) 124 may include one or more game APIs that interface with the streaming applications 168 of the client devices 104 to enable transmission of a stream of a game instance to the client device(s) 104. As another example, the streaming server(s) 124 may include one or more game session APIs that interface with game applications and/or the streaming applications of the streaming client device(s) 114 and/or the game engine 118 (or other components) of the gamer server(s) 116 to enable receipt of, generation of, and/or transmission of a stream of a game instance. Although different APIs are described herein, the APIs may be part of a single API, two or more of the APIs may be combined, different APIs may be included other than those described as examples herein, or a combination thereof.

The stream manager 126 may be configured to manage any number of instances of a game, such as live stream game instance 128 and/or pre-recorded game instance 120. For example, a user (e.g., streamer) may be playing an instance of a game on streaming client device(s) 114. The instance of the game may be rendered at the game server(s) 116 and/or at the streaming client device(s) 114 and displayed on a display of the streaming client device(s) 114. The streamer may wish to live stream the instance of the game. As such, the stream manager 126 of the streaming server(s) 124 may be configured to manage the live stream of the streamer (e.g., live stream game instance 128), and transmit the live stream game instance 128, including associated metadata, to client device(s) 104. Similarly, a user (e.g., streamer) may be playing an instance of a game on streaming client device(s) 114. The instance of the game may be rendered at the game server(s) 116 and displayed on a display of the streaming client device(s) 114. The streamer may wish to record the instance of the game for later streaming to other users (e.g., viewers). As such, streaming server(s) 124 may be configured to manage the pre-recorded stream of the streamer (e.g., pre-recorded game instance 120), and transmit the pre-recorded game instance 120, including associated metadata, to client device(s) 104.

Figure 1B:
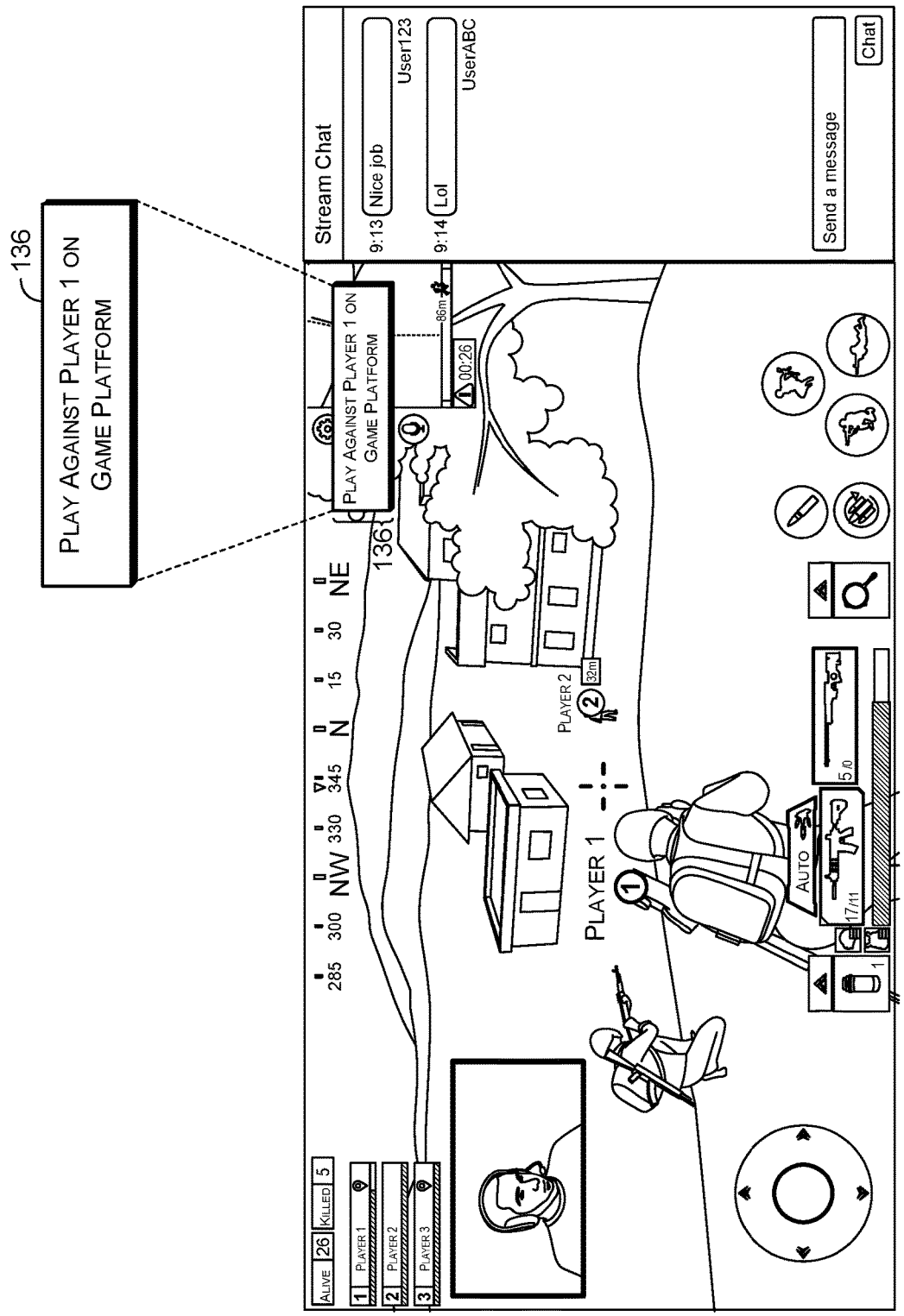
FIG. 1B is an example user interface of a game session including a graphical element for joining a live stream of a game instance, in accordance with some embodiments of the present disclosure.

Now referring to FIG. 1B, FIG. 1B is an example user interface of a game session including a graphical element for joining a live stream of a game instance, in accordance with some embodiments of the present disclosure. In particular, FIG. 1B includes a graphical element button 136 that, when actuated (e.g., by a viewer), initiates functions and operations to enable the viewer to play with and/or against a streamer during the live stream of the game instance. For example, a viewer may be viewing a live stream instance of gameplay that a streamer is streaming. During the live stream, metadata (as described herein) associated with the live stream instance of gameplay may be received and stored. Using the metadata (e.g., once received and/or processed), and as the viewer views the live stream, the button 136 may be populated on the display to enable the viewer to request access to join the streamer's gameplay. As such, upon the actuation of the graphical element button 136, and using the metadata, the game may be launched on the viewer's client device 104 (e.g., in a web browser portal, in a standalone application, etc.). This is discussed in further detail in association with method 200 of FIG. 2, below. It should be appreciated that the graphical element 136 representing the request to play the live stream instance of the game may display any number of play/join phrases, such as "play against player 1 on game platform," as can be seen in FIG. 1B.

Figure 1C:
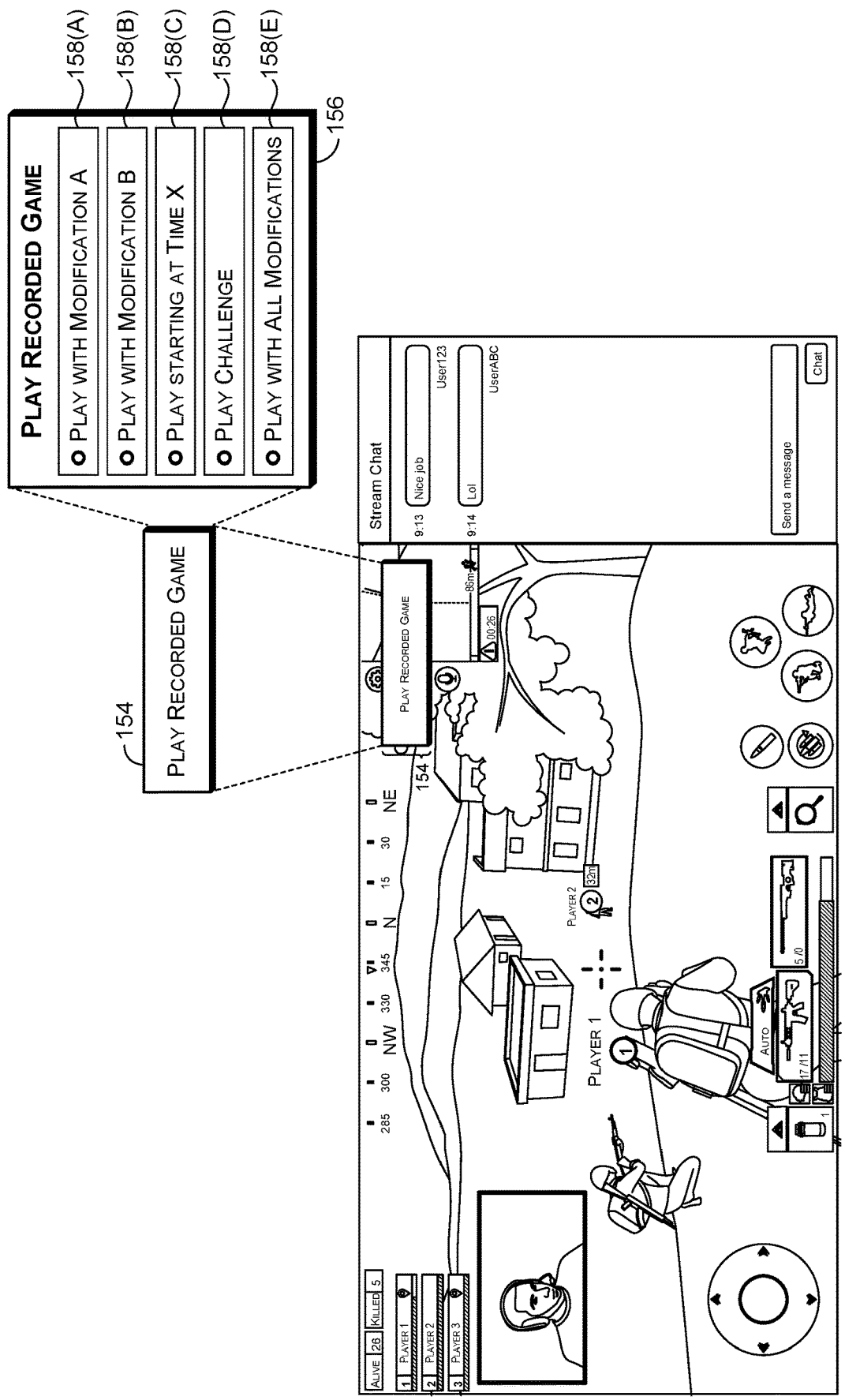
FIG. 1C is an example user interface of a game session including a graphical element for playing a pre-recorded stream of a game instance, in accordance with some embodiments of the present disclosure.

Now referring to FIG. 1C, FIG. 1C is an example user interface of a game session including a graphical element for playing a pre-recorded stream of a game instance, in accordance with some embodiments of the present disclosure. In particular, FIG. 1C includes a button 154 that, when actuated (e.g., by a viewer), provides the viewer access to play the specific game represented in the stream. For example, a viewer may be viewing a pre-recorded instance of gameplay generated from a streamer's game instance. The stream of the pre-recorded game and metadata (as described herein) associated with the stream may be received and stored. Using the metadata (e.g., once received and/or processed), and as the viewer views the pre-recorded stream, the button 154 may appear that may enable the viewer to play the specific version of the game they are viewing (e.g., the same game, with some or all of the same modification, from a particular waypoint or load point within the game, etc.). Upon the selection of the button 154, the game the viewer is viewing may be launched (e.g., after verification, and in a web browser portal, a standalone application, etc.). This is discussed in further detail in association with method 300 of FIG. 3 below. It should be appreciated that the button 154 representing the request to play the pre-recorded instance of a game may display any number of play/join phrases, such as "play recorded game," as can be seen in FIG. 1C. As an example, in addition to or in lieu of the button 154, a button 156 with selectable options 158A-158E may be displayed on the user interface of a game session. As described herein, if a viewer is viewing a pre-recorded game instance, such as pre-recorded game instance 120 of FIG. 1A, information regarding any specific versions, modifications, user-inventory, etc., associated with the pre-recorded gameplay stream may be identified and stored, such as by game application 106 and/or the streaming application 168 of the client device(s) 104 of FIG. 1A.

In some embodiments, the viewer may desire to play a game corresponding to the pre-recorded stream with some or all of the modifications from the instance of the game captured in the stream. The button 156 including selectable options 158A-158E may enable a viewer to select no modifications, a single modification, multiple modifications, or all of the modifications with which to play an instance of the game. The selectable options 158A-158E represent an example and non-exhaustive list of selectable options from which a viewer may select, and the options may vary depending on the embodiment, the specific game, the instance of the game, etc., without departing from the scope of the present disclosure. Upon the selection of the button 154 and/or the button 156 (including at least one of selectable options 158A-158E), the game the viewer is viewing may be launched (e.g., after verification, and in a web browser portal, a standalone application, etc.) within the game application 106. This process is discussed in further detail in association with method 300 of FIG. 3, below.

Figure 2:
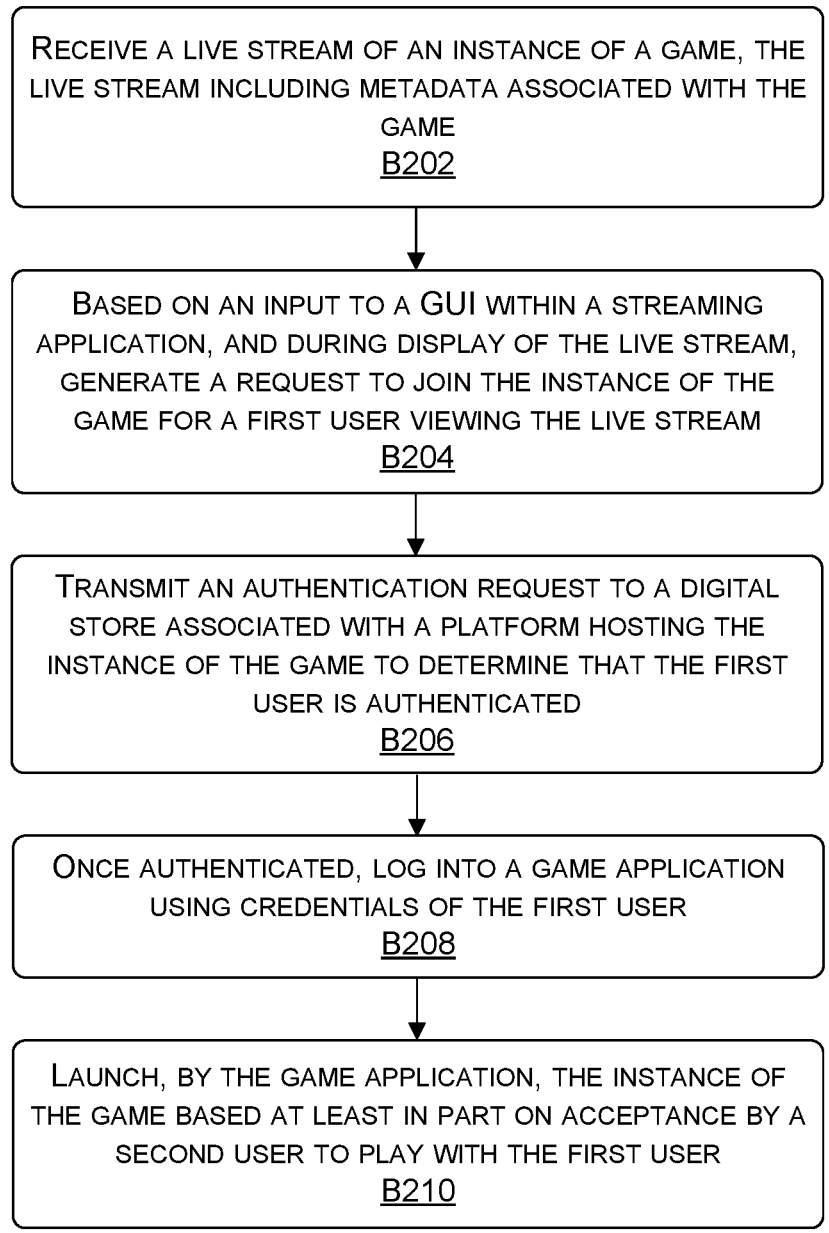
FIG. 2 is a flow diagram showing a method for joining a game instance from a live game broadcast, in accordance with some embodiments of the present disclosure.
Figure 3:
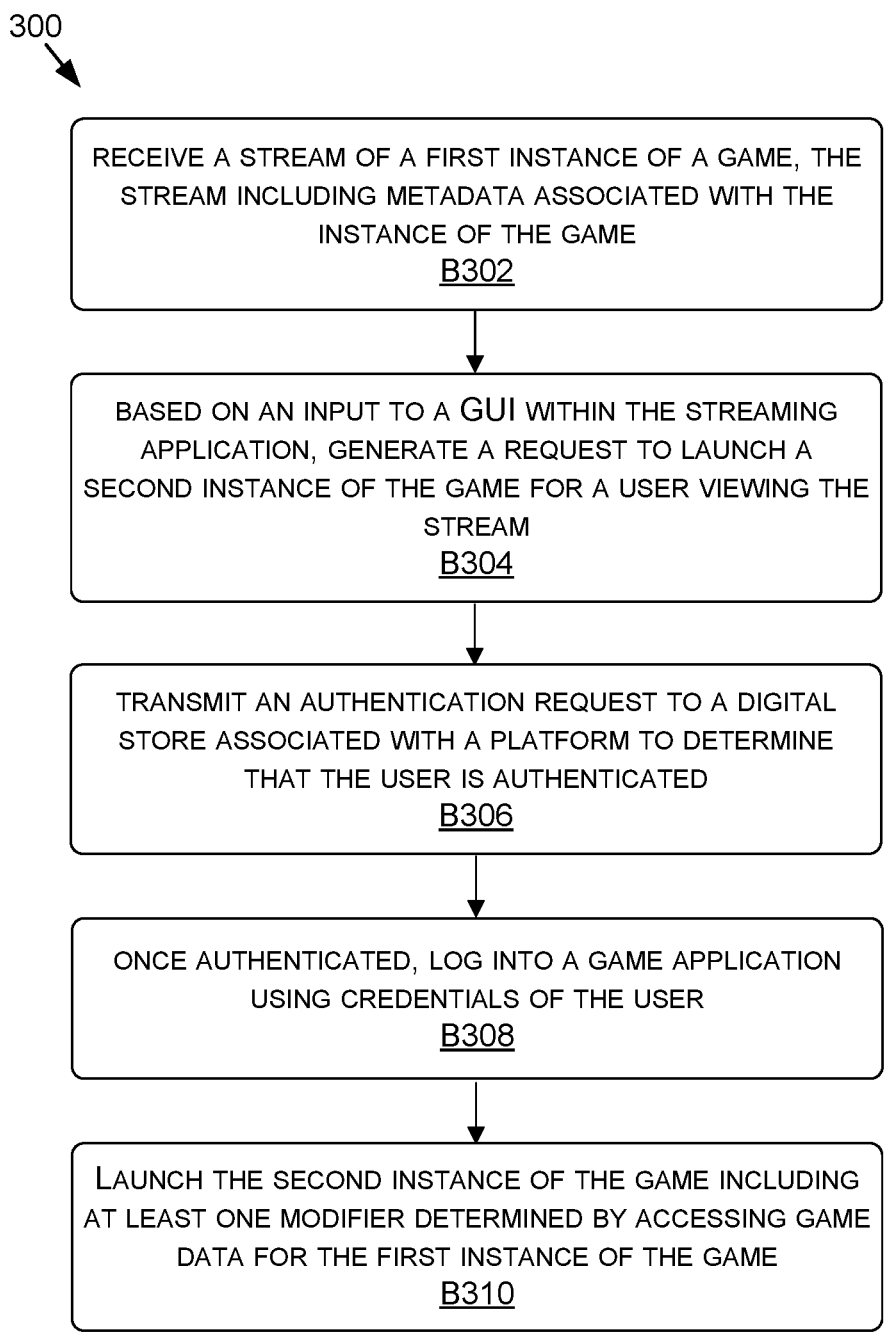
FIG. 3 is a flow diagram showing a method for joining a game instance from a pre-recorded game broadcast, in accordance with some embodiments of the present disclosure.

Now referring to FIGS. 2 and 3, each block of methods 200 and 300, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 200 and 300 are described, by way of example, with respect to the system of FIG. 1A. However, these methods may additionally or alternatively be executed by any one system, or any combination of systems, including, but not limited to, those described herein.

FIG. 2 is a flow diagram showing a method 200 for joining a live stream of a game instance from a game broadcast, in accordance with some embodiments of the present disclosure. The method 200, at block B202, includes receiving a live stream of an instance of a game, the live stream including metadata associated with the game. For example, the live stream game instance 128 may be received by the streaming application 168 of the client device 104, where the live stream game instance 128 may include metadata such as an identifier (e.g., username) of the streamer sharing the live stream, the platform (e.g., digital store) on which the instance of the game is being played by the streamer, the title of the game, and/or other information. For example, the metadata may include information that streamer "Streamer_123" is live streaming an instance of a game "Game_ABC" using a game platform "Platform_XYZ." The information included in the metadata can be identified by any number of components of the client device 104, such as the game application 106 and/or the streaming application 168 of client device(s) 104 of FIG. 1A. The live stream may be generated based on a streamer (e.g., a user playing the game on a streaming client device 114) requesting to generate a live stream of their gameplay.

The method 200, at block B204, includes, based on an input to a GUI within a streaming application, and during display of the live stream, generating a request to join the instance of the game for a first user viewing the live stream. For example, using the identified metadata, and as a viewer views the live stream of the game instance on the display 108 of the client device 104, the button 136 (e.g., a "join now" button or a "play game against Player 1 on game platform" button) may be populated on the display 108. The button 136 may enable the viewer to request access to join the streamer's gameplay. As such, upon the selection of the graphical element—and using the metadata representative of the digital store, game name, and/or platform information—the game may be launched on the viewer's device (e.g., in a web browser portal, in a standalone application, etc.), such as described herein.

The method 200, at block B206, includes transmitting an authentication request to a digital store associated with a platform hosting the instance of the game to determine that the first user is authenticated. For example, an authentication request may be generated using credentials of the viewer, the title of the game, and/or other information, to determine whether the viewer has access to the platform (e.g., NVIDIA's GEFORCE NOW) and/or to determine whether the viewer has access to and/or owns a copy of the game within the platform. As such, the viewer may be validated by the gameplay system 100 to confirm that the viewer may play the game. In some examples, the system may store login credentials of the user, or may use a single-sign-on (SSO) technique to automatically populate user credentials of the viewer and/or automatically log the viewer into the platform. In examples where the game platform and the streaming platform are a same platform, the user may already be authenticated. In other examples where the platforms differ, the validation may be prompted and/or executed by the game application 106 and/or the streaming application 168 prior to launching the instance of the game and/or the game application 106 for the viewer. As such, where the user is not validated, the streaming application 168 may continue to stream the live instance of the game without interruption (e.g., other than a notification that validation was unsuccessful). In some embodiments, the validation may be executed by the gameplay system 100 while the viewer is viewing the stream (e.g., in the background) such that the button 136 may only populate/be displayed within the streaming application 168 once the viewer has been validated. In other examples, the validation may occur after selection or actuation of the button 136. In addition, by validating the viewer the game platform, and logging in, the viewer may be able to participate in the gameplay using an associated identifier of the viewer, such as a username. As a result, all of the achievements, perks, unlocks, modifications, skills, and/or other information associated with the identifier of the viewer may be used during the gameplay. The validation, logging in, username or identifier retrieval, etc., may be part of an identify management system within the gameplay system 100. For example, the identify management system may manage individual identities, authentication, authorization, roles, privileges, and/or other information within the gameplay system 100.

The method 200, at block B208, includes, once authenticated, logging into a game application using credentials of the first user. For example, once the viewer has been authenticated or validated for playing the game on the game platform, the viewer may be logged into the game platform using credentials of the viewer. In one or more embodiments, as described herein, once validated, the viewer may be logged into the platform using the identity management system, such that the username of the viewer is active for playing with or against the streamer.

The method 200, at block B210, includes launching, by the game application, the instance of the game based at least in part on acceptance by a second user to play with the first user. For example, the streamer that is streaming their participation in the instance of the game may receive a request from the gameplay system 100 to allow the viewer to participate in the instance of the game. In some examples, the request may be a general request that the streamer acknowledges for allowing any viewers of their streams to participate in the games upon request. In other examples, the streamer may receive and respond to a request each time a viewer causes generation of a request. For example, the streamer may receive a request or other indication that the now in-game viewer wishes to join their gameplay instance. The streamer may optionally accept or deny the request, or the viewer may be added to a queue for playing with the streamer. The request may be generated in response to an input to the graphical element 136, in some embodiments. Upon the streamer accepting the viewer's join request, the viewer may be added to the instance of the game to with and/or against the streamer. In some cases, the viewer may be added to a queue for playing with and/or against the streamer in the near future (e.g., when space in the streamer's party becomes available). In some embodiments, the viewer may be able to select between playing with the streamer and playing against the streamer.

Now referring to FIG. 3, FIG. 3 is another flow diagram showing a method 300 for joining a pre-recorded stream of a game instance from a game broadcast, in accordance with some embodiments of the present disclosure. The method 300, at block B302, includes receiving a stream of a first instance of a game, the stream including metadata associated with the instance of the game. For example, a first instance of a game (e.g., pre-recorded game instance 120 of FIG. 1A) from the streaming client device 114 of a streamer may be received by the client device 104 of a viewer (e.g., via the streaming server(s) 124 and/or the game server(s) 116). The pre-recorded game instance 120 may include associated metadata (as described herein), such as the name information of the game being streamed, the platform identification information on which the game is played and on which the streamer is playing, digital store information associated with where to purchase the game (should purchase be necessary), game instance identifier information of the game (e.g., information associated with specific versions, modifications, user-inventory, life points, weapons-inventory, vehicle, outfit, stats, etc.), etc.

The method 300, at block B304, includes, based on an input to a GUI within the streaming application, generating a request to launch a second instance of the game for a user viewing the stream. For example, using the identified metadata, and as a viewer views the pre-recorded game instance on the display 108, the button(s) 154 and/or 156 may be populated within the streaming application 168. As such, upon the selection of the button(s) 154 and/or 156—and using the metadata—the game may be launched on the viewer's client device 104 (e.g., in a web browser portal, in a standalone application, etc.), as described herein.

The method 300, at block B306, includes transmitting an authentication request to a digital store associated with a platform to determine that the user is authenticated. For example, similar to the description above with respect to block B206 of FIG. 2, the viewer may be validated by the gameplay system 100 to confirm that the viewer may play the game.

The method 300, at block B308, includes, once authenticated, logging into a game application using credentials of the user. This process may be similar to that of block B208 of FIG. 2, described herein.

The method 300, at block B310, includes launching the second instance of the game including at least one modifier determined by accessing game data for the first instance of the game. For example, game session data (e.g., metadata, game state data, streamer associated unlocks, perks, modifications, etc.) may be accessed (e.g., using a game instance identifier of the first instance of the game) to determine at least one modifier for launching a new, second instance of the game in the game application 106 for the viewer to participate in. As described herein, because the viewer may be logged in using an identifier (e.g., a username), the gameplay information may be tracked and associated with the account of the viewer.

Figure 4:
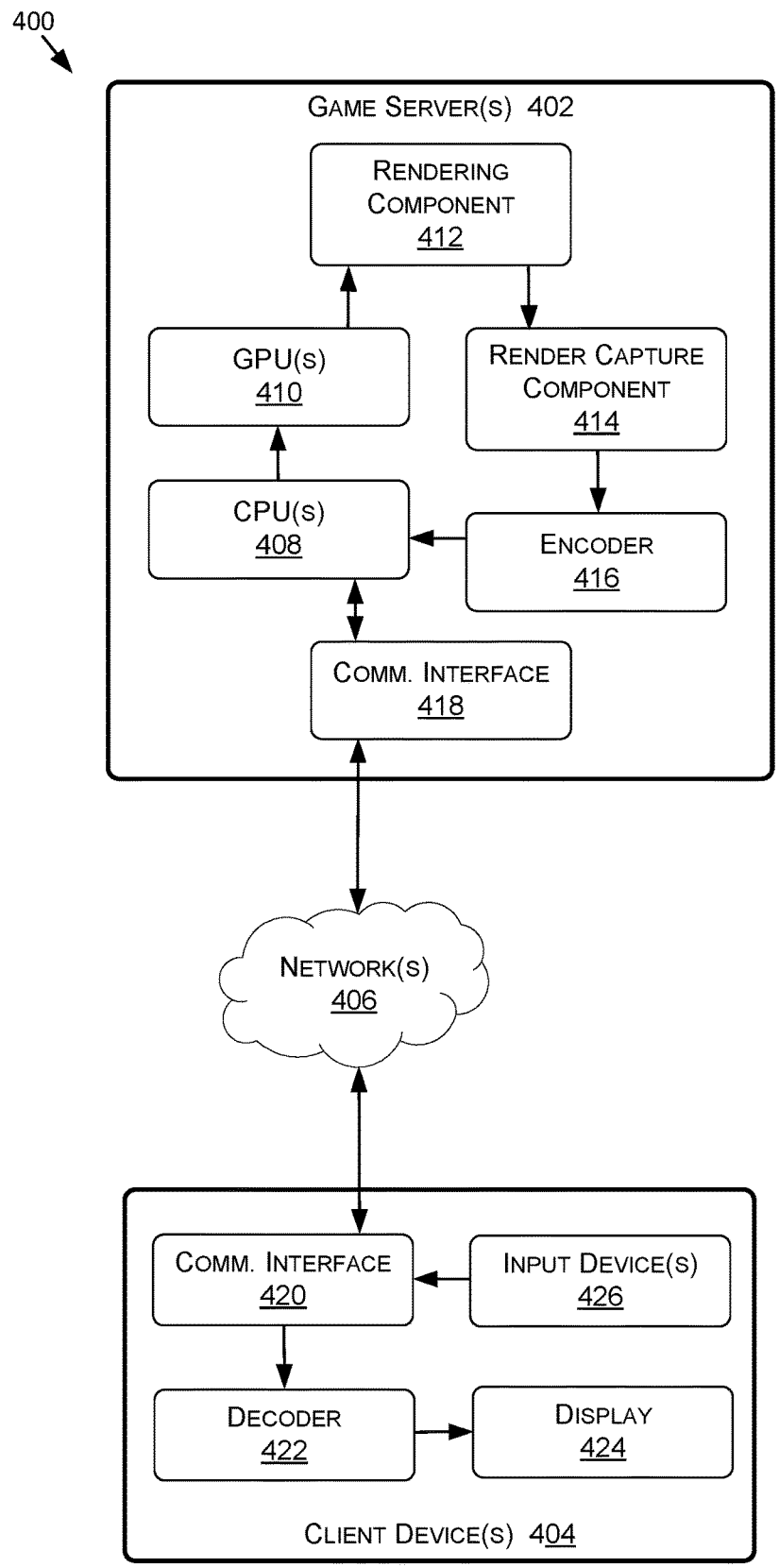
FIG. 4 is an example system diagram for a game streaming system, in accordance with some embodiments of the present disclosure.

Now referring to FIG. 4, FIG. 4 is an example system diagram for a game streaming system 400, in accordance with some embodiments of the present disclosure. FIG. 4 includes game server(s) 402 (which may include similar components, features, and/or functionality to the game server(s) 116 of FIG. 1A and/or the computing device 500 of FIG. 5), client device(s) 404 (which may include similar components, features, and/or functionality to the client devices 104 of FIG. 1A and/or the computing device 500 of FIG. 5), and network(s) 406 (which may be similar to the network(s) 102 of FIG. 1A). In some embodiments, the system 400 may be implemented as at least part of the gameplay system 100. For example, the cloud computing environment of the system 400 may be leveraged by the gameplay system 100 where, in such embodiments, the game server(s) 116 and/or the game platform may be similar to the game server(s) 402 and/or the client device(s) 104 and/or streaming client device(s) 114 may be similar to the client device(s) 404.

In the system 400, for a game session, the client device(s) 404 may only receive input data in response to inputs to the input device(s), transmit the input data to the game server(s) 402, receive encoded display data from the game server(s) 402, and display the display data on the display 424. As such, the more computationally intense computing and processing is offloaded to the game server(s) 402 (e.g., rendering of the game session is executed by the GPU(s) of the game server(s) 402), and the game session is streamed to the client device(s) 404 from the game server(s) 402—thereby reducing the requirements of the client device(s) 404 for graphics processing and rendering.

For example, with respect to an instantiation of a game session, a client device 404 may be displaying a frame of the game session on the display 424 based on receiving the display data from the game server(s) 402. The client device 404 may receive an input to one of the input device(s) and generate input data in response. The client device 404 may transmit the input data to the game server(s) 402 via the communication interface 420 and over the network(s) 406 (e.g., the Internet), and the game server(s) 402 may receive the input data via the communication interface 418. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 412 may render the game session (e.g., representative of the result of the input data) and the render capture component 414 may capture the rendering of the game session as display data (e.g., as image data capturing the rendered frame of the game session). The encoder 416 may then encode the display data to generate encoded display data and the encoded display data may be transmitted to the client device 404 over the network(s) 406 via the communication interface 418. The client device 404 may receive the encoded display data via the communication interface 420 and the decoder 422 may decode the encoded display data to generate the display data. The client device 404 may then display the display data via the display 424.

Figure 5:
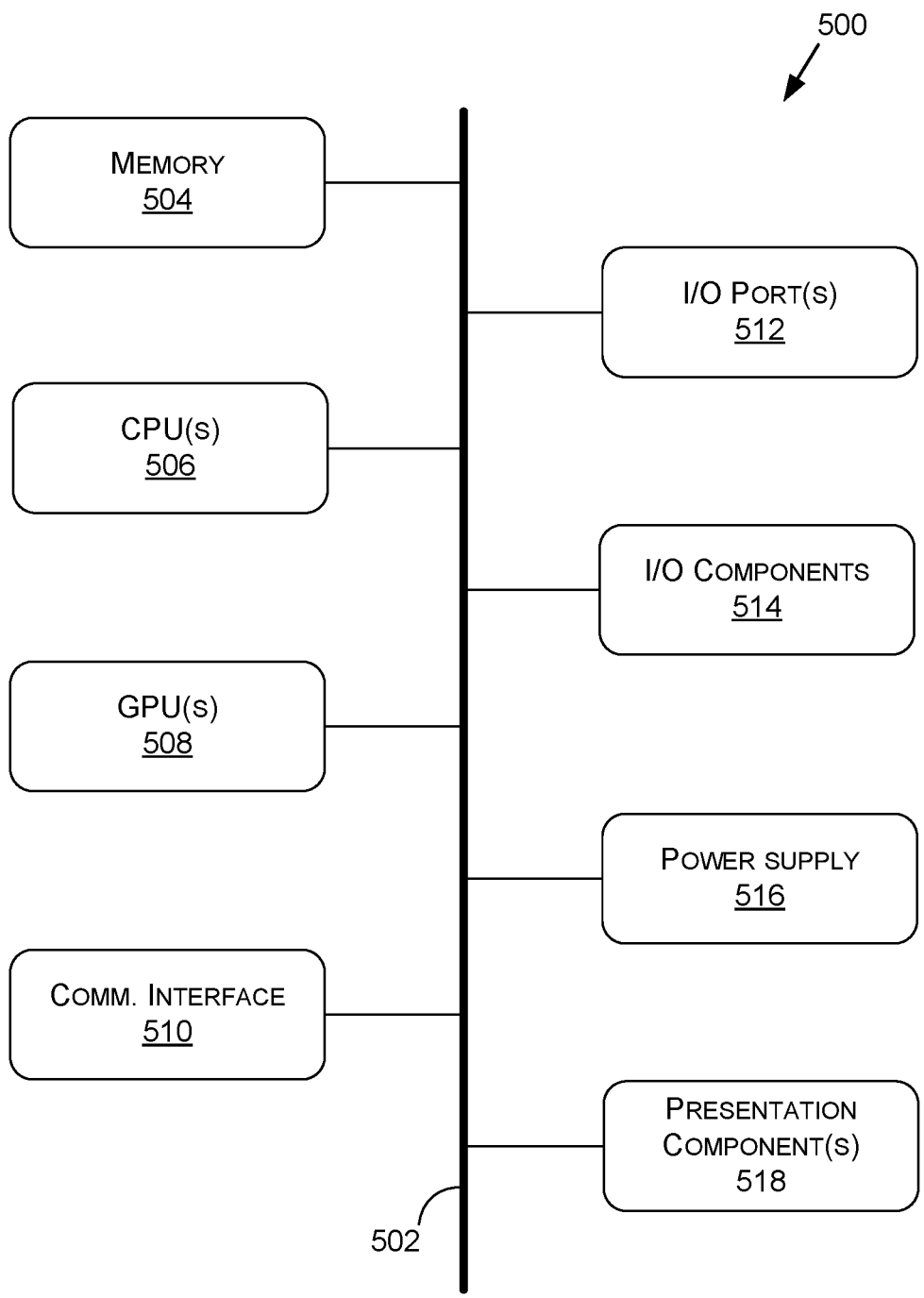
FIG. 5 is a block diagram of an example computing environment suitable for use in implementing some embodiments of the present disclosure.

FIG. 5 is a block diagram of an example computing device 500 suitable for use in implementing some embodiments of the present disclosure. Computing device 500 may include a bus 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, and one or more presentation components 518 (e.g., display(s)).

Although the various blocks of FIG. 5 are shown as connected via the bus 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). As such, the computing device of FIG. 5 is merely illustrative. Distinction is not made between such categories as "workstation," "server," "laptop," "desktop," "tablet," "client device," "mobile device," "handheld device," "game console," "electronic control unit (ECU)," "virtual reality system," and/or other device or system types, as all are contemplated within the scope of the computing device of FIG. 5.

The bus 502 may represent one or more busses, such as an address bus, a data bus, a control bus, or a combination thereof. The bus 502 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 506 may be configured to execute the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an ARM processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

The GPU(s) 508 may be used by the computing device 500 to render graphics (e.g., 3D graphics). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data. The display memory may be included as part of the memory 504. The GPU(s) 508 may include two or more GPUs operating in parallel (e.g., via a link). When combined together, each GPU 508 may generate pixel data for different portions of an output image or for different output images (e.g., a first GPU for a first image and a second GPU for a second image). Each GPU may include its own memory, or may share memory with other GPUs.

In examples where the computing device 500 does not include the GPU(s) 508, the CPU(s) 506 may be used to render graphics.

The communication interface 510 may include one or more receivers, transmitters, and/or transceivers that enable the computing device 500 to communicate with other computing devices via an electronic communication network, included wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    obtaining, using a streaming application associated with a first user, first data corresponding to a live stream of a first instance of a software application operated by a second user, the first data indicating modifications corresponding to respective sets of in-application content used in the first instance of the software application;
    generating a request to launch a second instance of the software application for the first user;
    causing display, using the first data, of a list of user interface (UI) elements in a user interface,
    at least one first UI element in the list of UI elements corresponding to a first user selection to launch the second instance using a first subset of the modifications in the second instance of the software application, and
    at least one second UI element in the list of UI elements corresponding to a second user selection to launch the second instance using a second subset of the modifications in the second instance of the software application, the second subset being different than the first subset; and
    based at least on the request to launch the second instance of the software application and the first user selection being made using the at least one first UI element, launching, using at least in part the streaming application, the second instance of the software application for the first user such that the first subset of the modifications are used in the second instance of the software application.

2. The method of claim 1, wherein the software application comprises a game application, and at least one of gameplay statistics, records, accolades, achievements, or game related information is generated in association with the first user during the second instance of the software application.

3. The method of claim 1, wherein the modifications include at least one unlockable modification that is locked by progress or one or more restrictions within the software application, and the at least one unlockable modification is excluded from the first subset of the modifications based at least on determining, using user data, that the at least one unlockable modification is locked for the first user.

4. The method of claim 1, wherein the modifications include at least one unlockable modification that is locked by progress or one or more restrictions within the software application, and the at least one unlockable modification is included in the first subset of the modifications based at least on determining, using user data, that the at least one unlockable modification is unlocked for the first user.

5. The method of claim 1,
    wherein the display of the list of UI elements is with a display of the first instance of the software application in the user interface.

6. The method of claim 1, wherein the software application comprises a game application, the modifications include at least one unlockable modification of the software application, and the at least one unlockable modification includes at least one of a perk, an item, a weapon, a skill level, a map alteration, a game format, a difficulty setting, or a health status.

7. The method of claim 1, wherein the software application is executed by a cloud application platform, and the launching the second instance of the software application includes receiving a stream of the second instance of the software application, the stream including a rendering of output generated using the second instance of the software application captured at a server remote from a client operated by the first user.

8. A system comprising:
    one or more processing units to execute operations comprising:
        receiving, using a streaming platform, first data representative of a stream of a first instance of a software application, the first data including metadata indicative of a first user identifier associated with the first instance of the software application and modifications of the software application used in the first instance of the software application, each modification of the modifications corresponding to a respective set of in-application content;
    causing display, using the first data, of a list of user interface (UI) elements in a user interface,
        at least one first UI element in the list of UI elements corresponding to a first user selection to launch a second instance of the software application using a first subset of the modifications in the second instance of the software application, and
        at least one second UI element in the list of UI elements corresponding to a second user selection to launch the second instance using a second subset of the modifications in the second instance of the software application, the second subset being different than the first subset;
        based at least on a request to launch the second instance of the software application and the first user selection being made using the at least one first UI element:
            selecting the first subset of modifications from the modifications for inclusion in the second instance of the software application; and
            causing the second instance of the software application to be launched in association with a second user identifier such that the selected first subset of modifications is used in the second instance of the software application.

9. The system of claim 8, wherein the system is comprised in at least one of:
    a system for performing simulation operations;
    a system for performing light transport simulation;
    a system for performing collaborative content creation for 3D assets;
    a system for performing deep learning operations;
    a system implemented using an edge device;
    a system implemented using a robot;
    a system for performing conversational AI operations;
    a system for generating synthetic data;
    a system incorporating one or more virtual machines (VMs);
    a system implemented at least partially in a data center; or
    a system implemented at least partially using cloud computing resources.

10. The system of claim 8, wherein the stream is prerecorded; and wherein causing the second instance of the software application to be launched further comprises causing an invitation to be transmitted to a device associated with the first user identifier to enable an account corresponding to the first user identifier to join the second instance of the software application.

11. The system of claim 8, wherein determining the second user identifier further comprises transmitting metadata associated with the streaming platform to an identity management system.

12. The system of claim 8, wherein the second instance of the software application is executed using a cloud application platform.

13. The system of claim 8, wherein the stream includes a rendering of output produced using the first instance of the software application captured at a server.

14. The system of claim 8, wherein causing the second instance of the software application to be launched further comprises using state information to recreate a state, within the second instance of the software application, from a load point after a start of the first instance of the software application.

15. A processor comprising:
one or more circuits to:
obtain, using a streaming platform, a first stream of a first instance of a software application associated with a first user and metadata indicating modifications corresponding to respective sets of in-application content used in the first instance of the software application;
obtain a request to launch a second instance of the software application for a second user associated with the streaming platform;
cause display, using the metadata, of a list of user interface (UI) elements in a user interface,
at least one first UI element in the list of UI elements corresponding to a first user selection to launch the second instance using a first subset of the modifications in the second instance of the software application, and
at least one second UI element in the list of UI elements corresponding to a second user selection to launch the second instance using a second subset of the modifications in the second instance of the software application, the second subset being different than the first subset;
select, based at least on the request and user data corresponding to the first user selection made using the at least one first UI element, the first subset of the modifications for inclusion in the second instance of the software application for the second user; and
obtain a second stream of the second instance of the software application, the second instance of the software application generated based at least the selecting and such that, the first subset of the modifications is used in the second instance of the software application for the second user.

16. The processor of claim 15, wherein the modifications include at least one unlockable modification that is used in the first instance of the software application based at least on the at least one unlockable modification being unlocked for the first user via gameplay progress.

17. The processor of claim 15, where the first stream includes a rendering of output produced using the first instance of the software application captured at a server.

18. The processor of claim 17, wherein the server executes the second instance of the software application.

19. The processor of claim 17, further comprising:
receiving, using the software application, user inputs to the second instance of the software application; and
transmitting data representative of the user inputs to the server.

20. The processor of claim 15, wherein the processor is comprised in at least one of:
a system for performing simulation operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

* * * * *